July 21, 1953 — S. M. UDALE — 2,646,486
CONTACT FOR IGNITION SYSTEMS
Filed Oct. 12, 1951
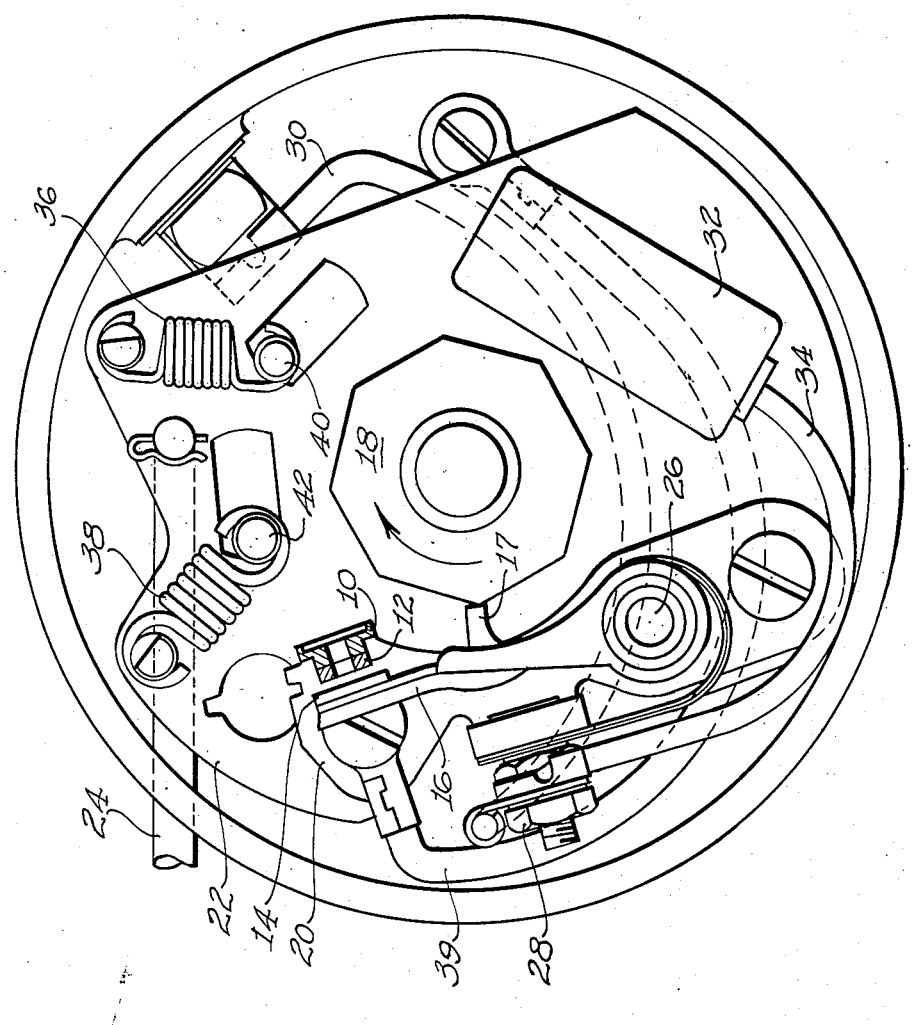
*INVENTOR.*

UNITED STATES PATENT OFFICE 2,646,486

CONTACT FOR IGNITION SYSTEMS

Stanley M. Udale, Detroit, Mich., assignor to Holley Carburetor Company, Detroit, Mich., a corporation of Michigan Application October 12, 1951, Serial No. 251,077

6 Claims. (Cl. 200—166)

The object of this invention is to improve the life of contact points in an automotive ignition system of the type which is now in general use.

Tungsten points are universally used, and recently, a combination of a stationary positive hollow point and a movable solid point which was negative have been found to give promise of a substantially longer life. To reduce the consumption of tungsten and to still further increase the life of the contact points are the objects of this invention.

Siliconized silicon carbide is a refractory material which has less conductivity than tungsten, but is highly refractory. The use of a hollow electrode makes it possible to use a larger area for the other contact so that the lack of conductivity of the carbide may be compensated for by its increased area, specifically, an area three times as great can be provided on the solid side of the contact as compared with the area on the hollow side of the contact. This material is produced by laying a piece of carbon on molten silicon and raising the temperature until a reaction occurs and the carbide of silicon becomes impregnated with silicon. This material has a specific resistance of .003 ohm/cm. cube when the carbon is prepared as follows:

|  | Per cent |
|---|---|
| Flake graphite | 28 |
| Wheat flour | 22 |
| Powdered charcoal | 10 |
| Casein glue (15% casein) | 40 |

This material is calcined before subjecting it to the silicon treatment. The trade name of this material is Durhy.

The drawing shows how the invention can be applied to the ordinary ignition. In the figure 10 is the stationary support for a hollow tungsten contact 12. 14 is the movable contact point made of siliconized silicon carbide brazed to a steel arm 16 which carries an insulated rubbing block 17, which is, in its turn, engaged by a rotating cam 18.

The dimensions of the hollow tungsten point 12 are .2" outside diameter, .09" inside and .042" thick. The dimension of the solid siliconized silicon carbide point is .300" outside diameter, and it can have a thickness of about the same as tungsten (.042"), or a little greater. With this combination, the area of the siliconized silicon carbide where it is brazed to the steel arm is three times that of the area of the hollow tungsten point 12, which is brazed to the stationary support 10. Siliconized silicon carbide is not, itself, a material that can be brazed to steel. It has first to be impregnated with nickel by the Schoop metal operation process. The increase in area of the carbide compensates for the relatively poor electrical conductivity of the siliconized silicon carbide contact with its supporting arm as compared with the conductivity of tungsten and steel.

The stationary contact 12 is preferably made positive, and the siliconized silicon carbide contact 14 is preferably made negative; although flat contacts are satisfactory, a spherical surface on the hollow contact is also satisfactory providing the curvature in convex. A radius of curvature of two or three inches is not objectionable for the hollow tungsten point as that ensures line contact on the inner lip of the hollow contact.

The stationary support 10 is connected to the plate 20 which is mounted on a plate 22 which is moved by rod 24. The arm 16 is mounted on a pin 26 which projects from the plate 20 but is insulated therefrom. Electricity is conducted to the circuit breaker through a conductor 30. A condenser 32 is connected across the points by a conductor 34 and a conductor 39, which grounds the stationary contact 12. The rotation of the plate 22 is resisted by the springs 36 and 38 which are connected to stationary pins 40 and 42. None of these details of the mechanism is part of this invention, which is directed to the substitution of siliconized silicon carbide for tungsten and its combination with a hollow tungsten contact point and the provision of an area three times that of the tungsten, which will reduce the resistance of the carbide.

What I claim is:

1. In an ignition system for internal combustion engines having stationary and a moveable contact, a first metallic and a second non-metallic contact member with substantially flat opposed contact surfaces, the first contact member having an opening in the center, through which air may pass and having an area of approximately one-third that of the non-metallic contact which is imperforate.

2. A device as set forth in claim 1 in which the first contact is made of tungsten and the second contact is made of siliconized silicon carbide.

3. A device as set forth in claim 1 in which the smaller contact is the stationary one and the movable contact is the larger one.

4. A device as set forth in claim 1 in which the smaller hollow contact is the positive and the negative is the larger contact.

5. In an ignition system for an internal combustion engine, a pair of relatively moveable contact members with substantially flat opposed contact surfaces having different areas, the contact surface with the smaller area being of tungsten, siliconized silicon carbide being the material for the larger.

6. A pair of contact points comprising an annular tungsten point engaging a larger contact point made of siliconized silicon carbide which latter is imperforate.

STANLEY M. UDALE.

References Cited in the file of this patent

UNITED STATES PATENTS

| Number | Name | Date |
| --- | --- | --- |
| 1,327,344 | Mason | Jan. 6, 1920 |
| 1,395,427 | Kent | Nov. 1, 1921 |
| 1,842,088 | Eichenberger | Jan. 19, 1932 |
| 2,072,112 | King | Mar. 2, 1937 |